(12) United States Patent
Kim et al.

(10) Patent No.: US 10,972,464 B2
(45) Date of Patent: Apr. 6, 2021

(54) NETWORK SYSTEM

(71) Applicant: SMK Corporation, Tokyo (JP)

(72) Inventors: Junsoo Kim, Tokyo (JP); Haruhiko Kondo, Tokyo (JP)

(73) Assignee: SMK Corporation, Tokyo (JP)

( * ) Notice: Subject to any disclaimer, the term of this patent is extended or adjusted under 35 U.S.C. 154(b) by 196 days.

(21) Appl. No.: 16/174,747

(22) Filed: Oct. 30, 2018

(65) Prior Publication Data

US 2019/0132318 A1 May 2, 2019

(30) Foreign Application Priority Data

Oct. 31, 2017 (JP) .............................. JP2017-210445

(51) Int. Cl.
*H04L 29/06* (2006.01)
*H04L 12/26* (2006.01)
(52) U.S. Cl.
CPC .............. *H04L 63/10* (2013.01); *H04L 43/10* (2013.01); *H04L 63/02* (2013.01); *H04L 63/102* (2013.01)
(58) Field of Classification Search
None
See application file for complete search history.

(56) References Cited

U.S. PATENT DOCUMENTS

| 2007/0039039 A1* | 2/2007 | Gilbert | H04L 63/0876 726/4 |
| 2009/0019141 A1* | 1/2009 | Bush | H04L 41/26 709/223 |
| 2019/0058597 A1* | 2/2019 | Lim | H04L 9/3239 |

FOREIGN PATENT DOCUMENTS

| JP | 2009-508398 A | 2/2009 |
| WO | 2007/030812 A2 | 3/2007 |

* cited by examiner

*Primary Examiner* — Andrew J Steinle
(74) *Attorney, Agent, or Firm* — Locke Lord LLP

(57) ABSTRACT

A network system that can easily augment security is provided. The network system includes an information device included in an internal network connected to an external network, the information device transmitting specific information including its own identification information and device information provided in advance, in conformity with a predefined protocol; and a management unit that monitors the internal network, and collects the specific information from the information device in conformity with the predefined protocol. The management unit collects specific information from an unknown information device, notifies a user of an authorization request for the unknown information device on the basis of the collected specific information, and determines whether or not to authorize access of the unknown information device to the internal network, in accordance with a response from the user to the authorization request.

12 Claims, 7 Drawing Sheets

Fig. 3

| Device Name | Device Information ||||  Identification Information | Connection Configuration Information || Authorization Request |
| | Category | Maker Name | Model Name | Model No. | MAC Address | Port Number | MAC Address of Connection Device | |
|---|---|---|---|---|---|---|---|---|
| Gateway | Gateway | A Company | AAA | aaaa | 00-00-00-00-00-00 | P1 | 11-11-11-11-11-11 | Authorized |
| Network Device | Switching Hub | B Company | BBB | bbbb | 11-11-11-11-11-11 | P2 | 22-22-22-22-22-22 | Authorized |
| | | | | | | P3 | 33-33-33-33-33-33 | |
| | | | | | | P4 | 44-44-44-44-44-44 | |
| | | | | | | P5 | 55-55-55-55-55-55 | |
| End Terminal 12 | Desktop Personal Computer | C Company | CCC | cccc | 22-22-22-22-22-22 | — | — | Authorized |
| End Terminal 13 | Electronic Lock Door | D Company | DDD | dddd | 33-33-33-33-33-33 | — | — | Authorized |
| End Terminal 14 | Air Conditioner | E Company | EEE | eeee | 44-44-44-44-44-44 | — | — | Authorized |
| End Terminal 15 | Interior Monitoring Web Camera | F Company | FFF | ffff | 55-55-55-55-55-55 | — | — | Authorized |

NETWORK SYSTEM

CROSS REFERENCE TO RELATED APPLICATION

This application claims priority to Japanese Application No. 2017-210445 filed Oct. 31, 2017 which is assigned to the assignee of the present application and is incorporated by reference herein.

FIELD

The present invention relates to a network system. In particular, the present invention relates to a home network system.

BACKGROUND

Home network systems are often used by general users who do not understand network technology in enough detail. Thus, even if an unauthorized information device breaks through a firewall provided in a router or the like and is connected to the home network system, the user may not become aware of the connection and allow the unauthorized information device to use the home network system fraudulently.

Patent Literature 1 discloses a system in which a security switch is provided in a router or the like. The system switches between a mode of enabling a connection to a local area network and a mode of disabling the connection thereto, in accordance with a state of the security switch, in order to augment the security of the network.

CITATION LIST

Patent Literature

Patent Literature 1: Japanese Translation of PCT Patent Application Publication No. 2009-508398 (WO2007/030812)

SUMMARY

Technical Problem

However, the system disclosed in Patent Literature 1 needs to provide the security switch in the router or the like, and whenever a device is connected to the network, a user has to push the security switch. This results in the security system of complicated configuration.

In the system disclosed in Patent Literature 1, to connect a device to the network, the user has to check a MAC (media access control) address of the device and determine whether or not to authorize a connection of the device. Therefore, according to the system disclosed in Patent Literature 1, it is difficult for general users who do not understand network technology in enough detail to check a MAC address and determine whether or not to authorize a connection of the device.

Considering the circumstances described above, an object of the present invention is to solve the problems described above. In other words, an object of the present invention is to provide a network system that can easily augment security.

Solution to Problem

A network system according to an aspect of the present invention includes: an information device included in an internal network connected to an external network, the information device being configured to transmit specific information including its own identification information and device information provided in advance, in conformity with a predefined protocol; and a management unit configured to monitor the internal network, and collect the specific information from the information device in conformity with the predefined protocol. The management unit collects specific information from an unknown information device, the specific information of the unknown information device including its own identification information and device information, notifies a user of an authorization request for the unknown information device on the basis of the collected specific information, and determines whether or not to authorize access of the unknown information device to the internal network, in accordance with a response from the user to the authorization request.

In the network system, the management unit preferably generates map information to make connection configuration of the internal network visible to the user, on the basis of the collected specific information, and preferably notifies the user of the generated map information in a manner that is included in the authorization request.

In the network system, when the unknown information device is an information device conforming to the predefined protocol, the management unit preferably generates the map information on the basis of the device information transmitted from the information device having already been connected to the internal network and the device information transmitted from the unknown information device, and preferably notifies the user of the generated map information in a manner that is included in the authorization request.

In the network system, when the unknown information device is an information device nonconforming to the predefined protocol, the management unit preferably generates warning information including the identification information transmitted from the unknown information device, and preferably notifies the user of the generated warning information in a manner that is included in the authorization request.

In the network system, the management unit preferably searches for the unknown information device by a search system for the external network using the identification information transmitted from the unknown information device, and preferably generates the map information on the basis of a search result.

In the network system, the internal network is preferably a home network. The predefined protocol is preferably HTIP (home-network topology identifying protocol). The device information preferably represents a category, a maker name, a model name, and a model number of the information device. The identification information is preferably a MAC (media access control) address.

Advantageous Effects of Invention

The network system according to the aspect of the present invention can easily augment security.

BRIEF DESCRIPTION OF DRAWINGS

Some embodiments of the present invention will be described below with reference to the accompanying drawings, as just examples.

FIG. 3 is a table of device information and the like managed by a management unit according to the first embodiment.

DESCRIPTION OF EMBODIMENTS

Embodiments of the present invention will be described below in detail, with reference to the drawings. The following embodiments just show some examples of the present invention, and do not limit the substance of the present invention. All of configurations and operations described in each of the embodiments are not necessarily required as the configurations and operations of the present invention.

First Embodiment: Configuration of Network System

Figure 1:
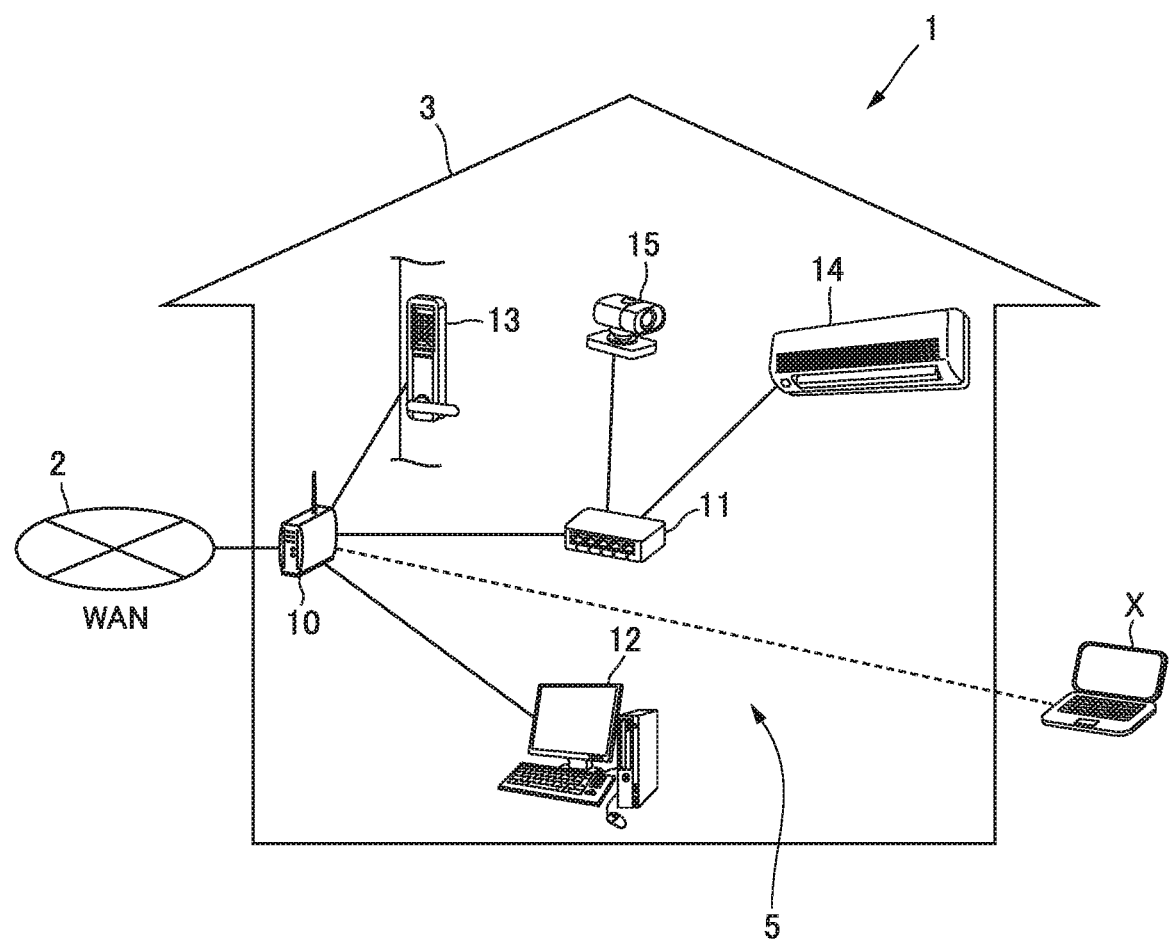
FIG. 1 is a drawing showing a configuration of a network system according to a first embodiment of the present invention.

FIG. 1 is a drawing showing a configuration of a network system 1 according to a first embodiment of the present invention.

The network system 1 is a computer network system. The network system 1 establishes an internal network 3 to be connected to an external network 2 through a gateway 10. More specifically, the external network 2 may be a WAN (wire are network) such as the Internet, and the internal network 3 may be a LAN (local area network). The external network 2 may be an opened network, and the internal network 3 may be a closed network. The internal network 3 may be a VPN (virtual private network). The network system 1 may be preferably a home network system in which devices are wiredly or wirelessly connected to a router having the gateway 10 in a home, so as to be connected to the Internet through the gateway 10.

The network system 1 is a system that is in conformity with a predefined protocol to detect and manage connections of a data link layer, such as HTIP (home-network topology identifying protocol) or LLDP (link layer discovery protocol). The network system 1 is preferably in conformity with HTIP. This embodiment will be described on the assumption that the network system 1 is in conformity with HTIP.

The network system 1 includes information devices 5 that constitute network nodes of the internal network 3. The information devices 5 include the gateway 10 for connecting the internal network 3 to the external network 2, and at least one end terminal connected to the gateway 10. For example, as shown in FIG. 1, the information devices 5 may include the gateway 10, a network device 11, and a plurality of end terminals 12 to 15.

The network device 11 has multiple ports. The network device 11 has the functions of receiving a frame or packet by one of the ports, and transferring the received frame or packet to another of the ports. As shown in FIG. 1 as an example, the network device 11 may be a switching hub.

Each of the end terminals 12 to 15 is a device that terminates the frame or packet. As shown in FIG. 1 as an example, the end terminals 12 to 15 may be devices installed in a home, such as home information electrical appliances. In FIG. 1, the end terminals 12 to 15 are a desktop personal computer, an electronic lock door, an air conditioner, and an interior monitoring Web camera, respectively, by way of example.

The information devices 5 are categorized into information devices 5A on which an agent program is installed to realize an agent function of HTIP, and information devices 5M on which a manager program is installed to realize a manager function of HTIP.

The manager program may be installed on arbitrary information devices 5 included in the internal network 3. The agent program may be installed on the other information devices 5, except for the devices on which the manager program is installed. In this embodiment, the manager program is installed on the end terminal 12, i.e. the desktop personal computer. The agent program is installed on the gateway 10, the network device 11, and the end terminals 13 to 15.

Figure 2:
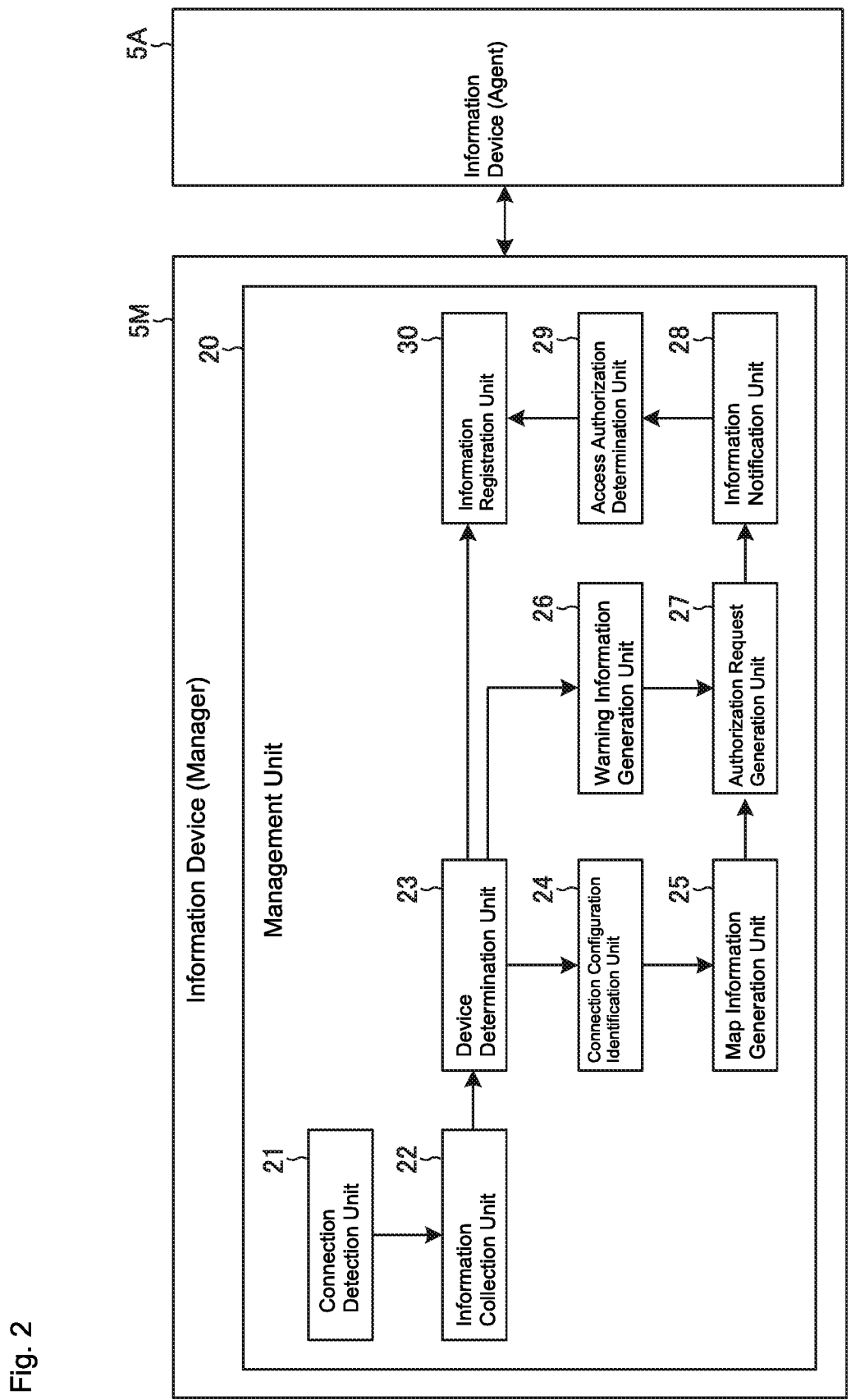
FIG. 2 is a block diagram showing a functional configuration of information devices according to the first embodiment.

FIG. 2 is a block diagram showing a functional configuration of the information devices 5 according to the first embodiment.

The information device 5A is included in the internal network 3. The information device 5A transmits specific information to the information device 5M in conformity with HTIP. Here, the specific information includes its own identification information and device information provided to the information device 5A in advance. When the information device 5A is the network device 11, the information device 5A transmits the following information to the information device 5M, as the specific information, as well as the own identification information and the device information. The information device 5A, i.e., the network device 11, transmits identification information and device information of each of the end terminals 14 and 15 connected to the ports, and connection configuration information to the information device 5M. Here, the connection configuration information represents the connection configuration of the end terminals 14 and 15. The identification information, the device information, and the connection configuration information will be described later with reference to FIG. 3.

The information device 5M includes a management unit 20 that monitors the internal network 3, and collects the specific information from the information devices 5 in conformity with HTIP. The management unit 20 can be configured by the manager program that realizes the manager function of HTIP using a processor and a memory device of the information device 5M.

To be more specific, as shown in FIG. 2, the management unit 20 includes a connection detection unit 21 and an information collection unit 22. The connection detection unit 21 detects connections of the information devices 5 to the internal network 3. The information collection unit 22 collects the specific information from the information devices 5 the connections of which have been detected by the connection detection unit 21.

The management unit 20 further includes a device determination unit 23. The device determination unit 23 determines whether each of the information devices 5 the connections of which have been detected by the connection detection unit 21 is an information device 5A conforming to HTIP or an information device 5 nonconforming to HTIP, on the basis of the specific information collected by the information collection unit 22. The device determination unit 23 can also determine whether each of the information devices 5 the connections of which have been detected by the connection detection unit 21 is an authorized information device 5 that is authorized to be valid by a user, or an unknown information device X that is unauthorized to be valid by the user.

The management unit 20 further includes a connection configuration identification unit 24 and a map information generation unit 25. The connection configuration identification unit 24 identifies the connection configuration of the internal network 3 on the basis of the specific information collected by the information collection unit 22. The map information generation unit 25 generates map information that represents the connection configuration identified by the connection configuration identification unit 24, as user visible information. The map information will be described later with reference to FIG. 4.

The management unit 20 further includes a warning information generation unit 26. The warning information generation unit 26 generates warning information that warns the user that the information device 5 the connection of which has been detected by the connection detection unit 21 may be a fraudulent information device 5. The warning information generation unit 26 generates the warning information including the identification information of the information device 5 the connection of which has been detected by the connection detection unit 21. When the information device 5 the connection of which has been detected by the connection detection unit 21 is an unknown information device X, which is unauthorized to be a valid information device 5, and is an information device 5 nonconforming to HTIP, the warning information generation unit 26 generates the warning information.

Irrespective of whether or not the information device 5 the connection of which has been detected by the connection detection unit 21 is authorized as a valid information device 5, when the information device 5 the connection of which has been detected by the connection detection unit 21 is an information device 5 nonconforming to HTIP, the warning information generation unit 26 may generate the warning information. Otherwise, irrespective of whether or not the information device 5 the connection of which has been detected by the connection detection unit 21 is an information device 5A conforming to HTIP, when the information device 5 the connection of which has been detected by the connection detection unit 21 is an unknown information device X that is unauthorized as a valid information device 5, the warning information generation unit 26 may generate the warning information.

The management unit 20 further includes an authorization request generation unit 27. The authorization request generation unit 27 generates an authorization request to let the user determine whether or not to authorize the information device 5 the connection of which has been detected by the connection detection unit 21, as a valid information device 5. The authorization request generation unit 27 generates the authorization request in a manner that includes at least one of the generated map information and warning information.

The management unit 20 further includes an information notification unit 28 that notifies the user of the authorization request generated by the authorization request generation unit 27. The information notification unit 28 transmits the authorization request to a user's information terminal, such as a smartphone. When the management unit 20 is installed on an administrator's personal computer or the like in the internal network 3, the information notification unit 28 may transmit the authorization request to the administrator's personal computer. When the management unit 20 is installed in the router having the gateway 10, the user may be notified of the authorization request using a blinking lamp or the like of the router. In this case, the user may connect the administrator's personal computer to the router, to display the authorization request thereon.

The management unit 20 further includes an access authorization determination unit 29. The access authorization determination unit 29 determines whether or not to authorize access of the information device 5 the connection of which has been detected by the connection detection unit 21 to the internal network 3, in accordance with a user's response to the authorization request. The management unit 20 further includes an information registration unit 30. The information registration unit 30 registers the specific information collected by the information collection unit 22 and authorization information, which represents whether or not the user has authorized the information device 5 the connection of which has been detected by the connection detection unit 21, in association with each other, on the certain memory device.

In this embodiment, when the information device 5 is connected to the internal network 3, a process performed by the management unit 20 to authorize the information device 5 is also referred to as "device authorization process." The device authorization process will be described below in detail with reference to FIG. 5.

FIG. 3 is a table of the device information and the like managed by the management unit 20 according to the first embodiment.

As shown in FIG. 3, the management unit 20 registers and manages the device information, identification information, the connection configuration information, and the authorization information of each of the information devices 5, in association with each information device 5.

The device information, which is provided in advance for each of the information devices 5, represents a category, a maker name (maker code), a model name, and a model number of each information device 5. The category of the device information represents the type of the information device 5, such as a television or a recorder. The category and the like included in the device information are defined in advance by HTIP. The identification information is unique information to each information device 5, such as a MAC address, and is provided in advance for each of the information devices 5. The device information and the identification information are information to designate each individual information device 5, and are also collectively referred to as designation information.

The connection configuration information represents the configuration of connection devices connected to respective ports of the gateway 10 and the network device 11, which have multiple ports and transfer frames or packets. The connection configuration information is correspondence information between a port number of each port and a MAC address of the connection device connected to each port. The connection configuration information may be a MAC address table.

The management unit 20 can also register and manage other information than the device information, identification information, connection configuration information, and authorization information of each information device 5, in association with each information device 5. For example, the management unit 20 can register and manage information such as an IP (internet protocol) address assigned to each information device 5, in association with each information device 5.

Figure 4:
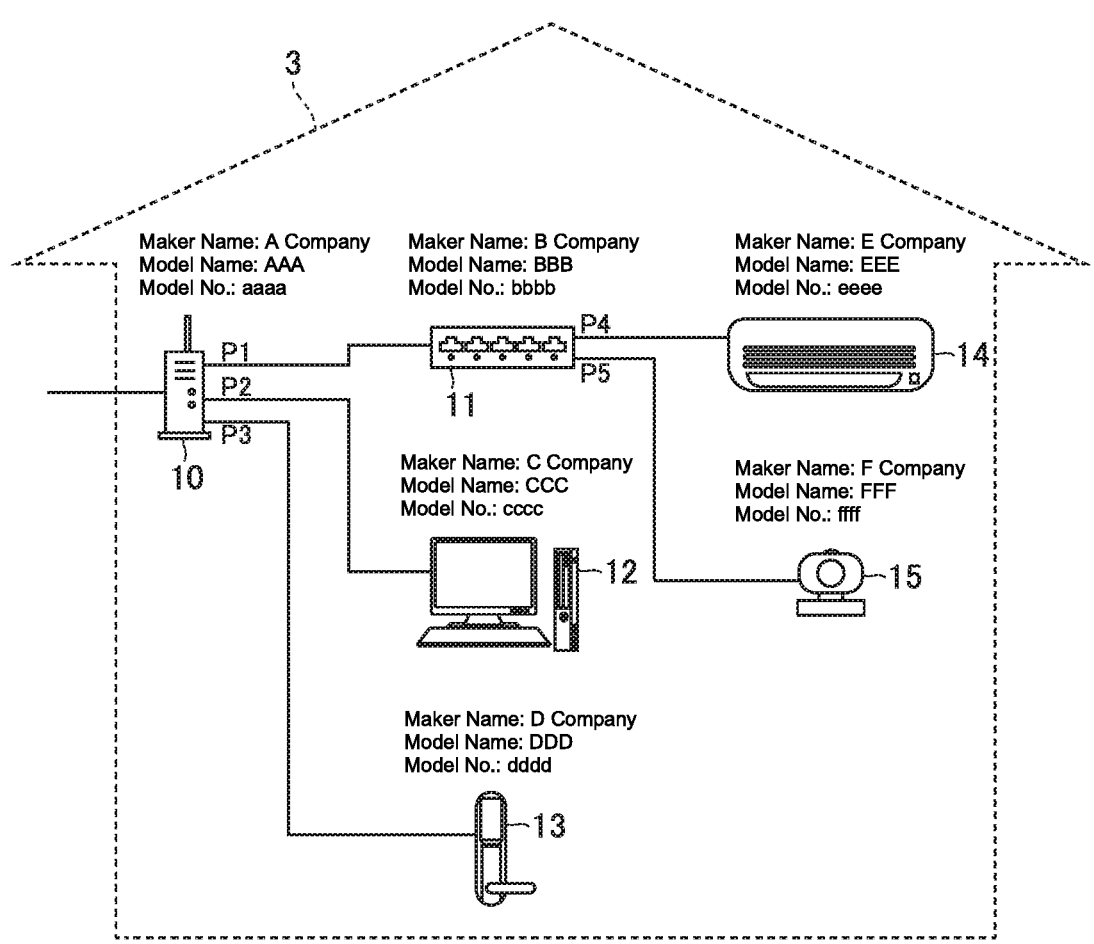
FIG. 4 is a drawing showing map information generated by the management unit according to the first embodiment.

FIG. 4 is a drawing showing the map information generated by the management unit 20 according to the first embodiment.

The map information is user visible information representing the connection configuration of the internal network 3. In other words, using the map information, the user can see a topology of the internal network 3. As shown in FIG. 4, the map information represents an image of each information device 5, the device information and port number of each information device 5, and connection relationship (links) with the other information devices 5, in a user visible manner. The map information may include the identification information (MAC address) of each information device 5.

First Embodiment: Device Authorization Process

Figure 5:
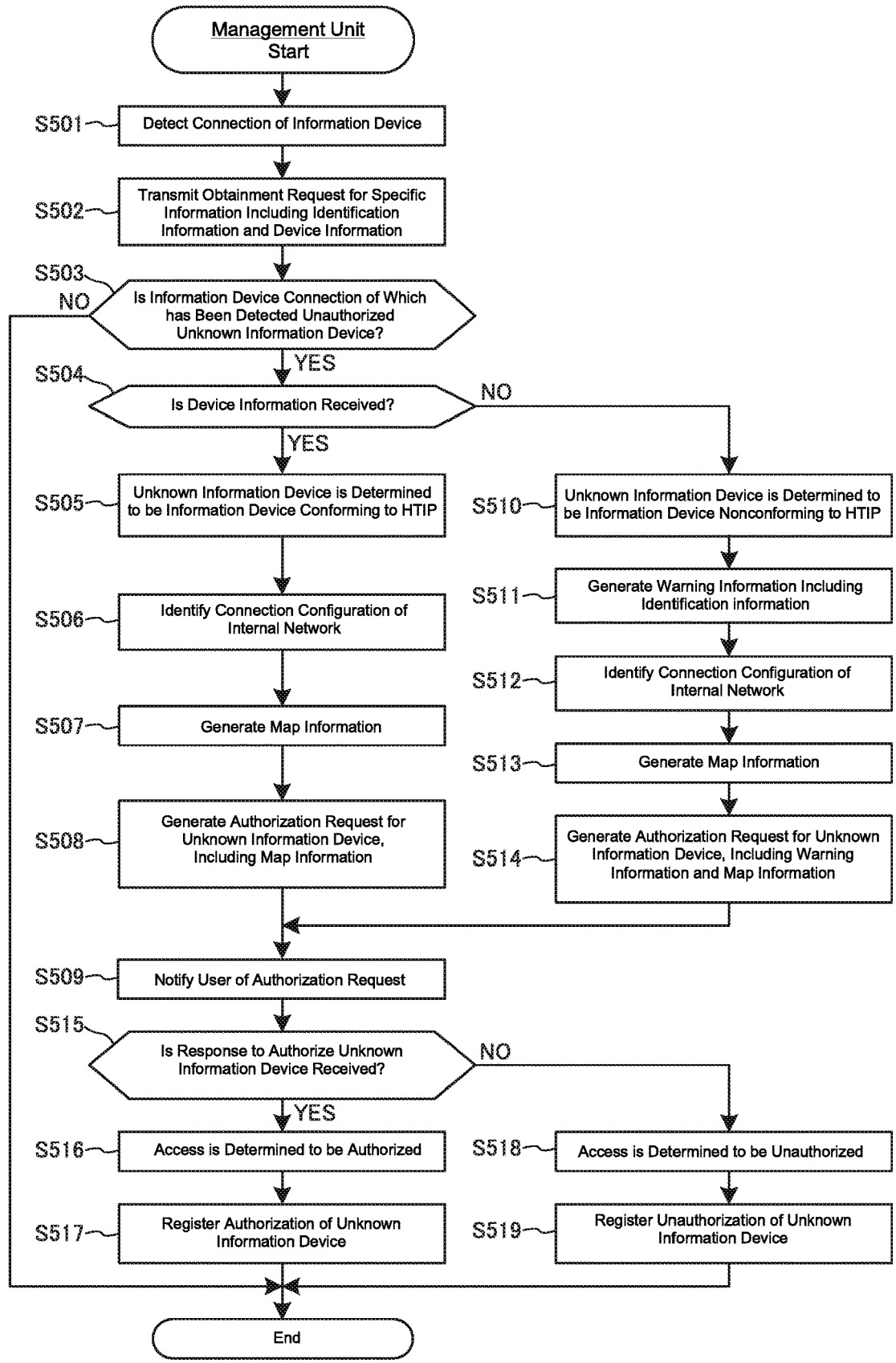
FIG. 5 is a flowchart of a device authorization process performed by the management unit according to the first embodiment.
Figure 6A:
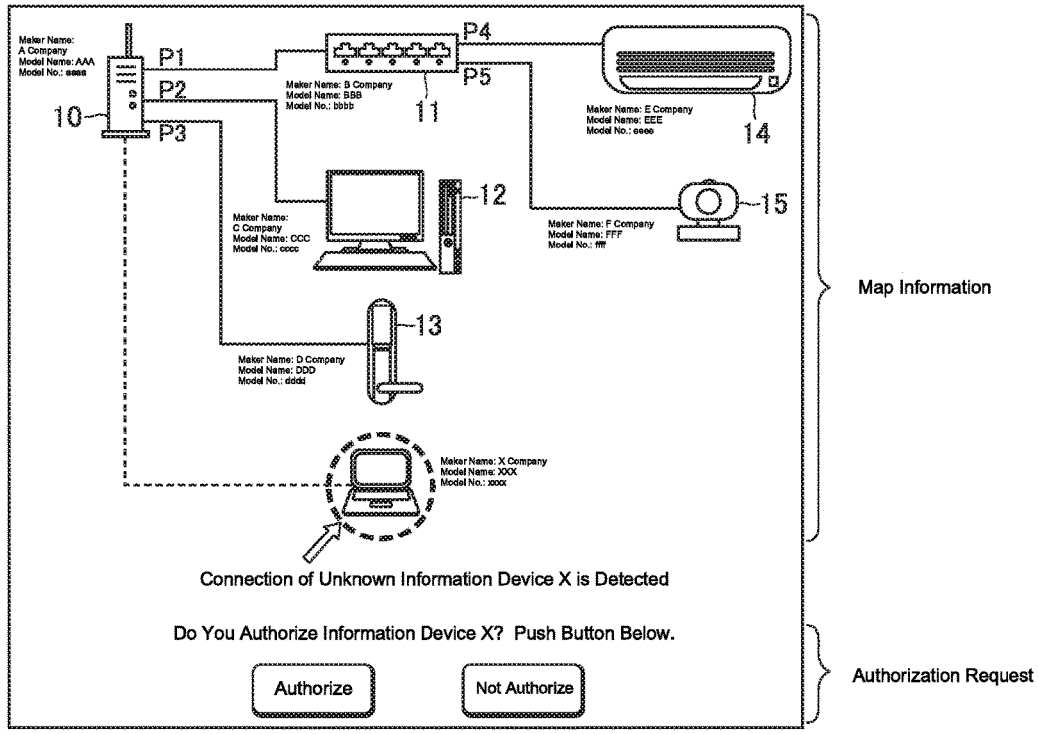
FIG. 6A and FIG. 6B are drawings of authorization request screens on which the management unit according to the first embodiment notifies a user of an authorization request.
Figure 6B:
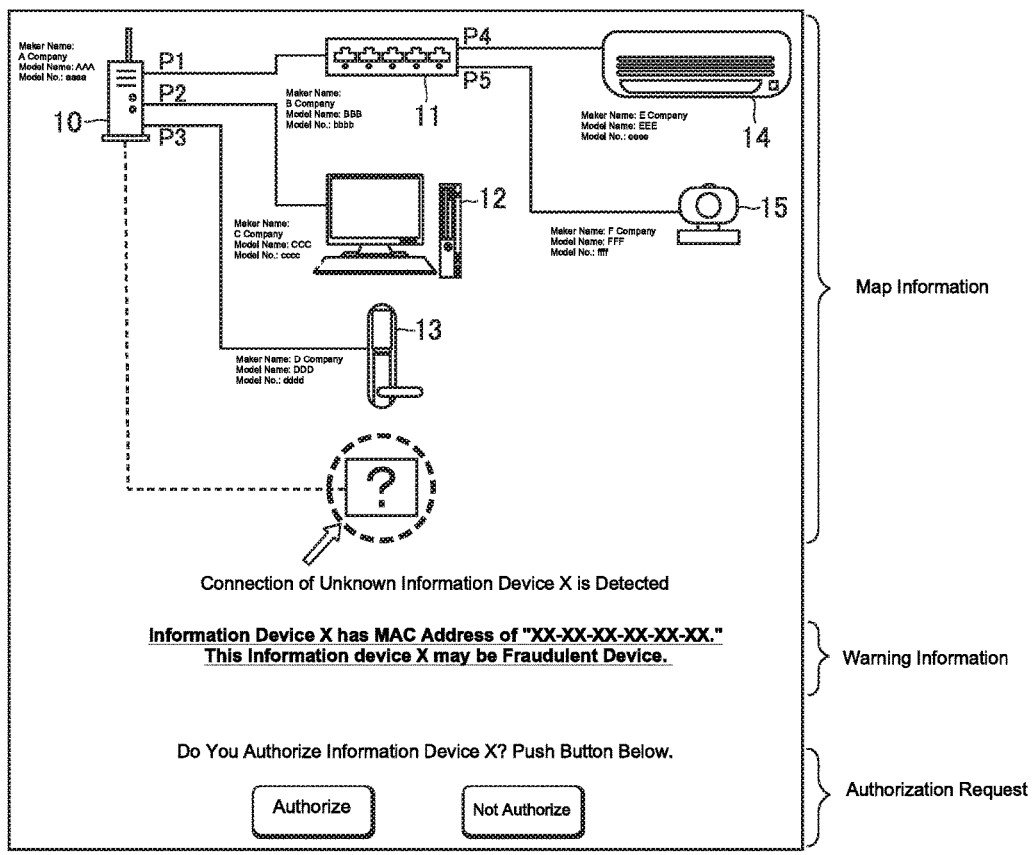

FIG. 5 is a flowchart of the device authorization process performed by the management unit 20 according to the first embodiment. FIG. 6A and FIG. 6B are drawings of authorization request screens on which the management unit 20 according to the first embodiment notifies the user of the authorization request.

In step S501, the management unit 20 detects connection of an information device 5 to the internal network 3.

In step S502, in order to collect specific information including identification information, device information, and connection configuration information of the information device 5 the connection of which has been detected, the management unit 20 transmits an obtainment request for the specific information to the information device 5 the connection of which has been detected.

When the information device 5 the connection of which has been detected is a device conforming to HTIP, the information device 5 the connection of which has been detected transmits at least its own identification information and device information to the management unit 20, in response to the obtainment request. When the information device 5 the connection of which has been detected is a network device 11 conforming to HTIP, the information device 5 the connection of which has been detected further transmits connection configuration information to the management unit 20. On the other hand, when the information device 5 the connection of which has been detected is a device nonconforming to HTIP, the information device 5 the connection of which has been detected transmits at least its own identification information to the management unit 20 in response to the obtainment request.

In step S503, the management unit 20 determines whether or not the information device 5 the connection of which has been detected is an unknown information device X, which is unauthorized by a user as a valid information device 5. The management unit 20 may determine whether or not the information device 5 the connection of which has been detected is an unknown information device X, on the basis of the identification information transmitted from the information device 5 the detection of which has been detected. To be more specific, the management unit 20 may determine whether or not the information device 5 the connection of which has been detected is an unknown information device X, by determining whether or not the identification information transmitted from the information device 5 the connection of which has been detected has already been registered on a table, as shown in FIG. 3. When the information device 5 the connection of which has been detected is not an unknown information device X, the management unit 20 ends this process. On the other hand, when the information device 5 the connection of which has been detected is an unknown information device X, the operation proceeds to step S504.

In step S504, the management unit 20 determines whether or not to have received device information from the unknown information device X the connection of which has been detected. In other words, the management unit 20 determines whether or not the specific information transmitted from the unknown information device X the connection of which has been detected includes device information. When the management unit 20 has received no device information from the unknown information device X the connection of which has been detected, the operation proceeds to step S510. On the other hand, when the management unit 20 has received device information from the unknown information device X the connection of which has been detected, the operation proceeds to step S505.

In step S505, the management unit 20 determines that the unknown information device X the connection of which has been detected is an information device 5 conforming to HTIP. In other words, when the specific information transmitted from the unknown information device X the connection of which has been detected includes the device information, the management unit 20 determines that the unknown information device X is an information device 5 conforming to HTIP.

In step S506, the management unit 20 identifies the connection configuration of the internal network 3 on the basis of the specific information collected from the information devices 5 connected to the internal network 3. To be more specific, the management unit 20 identifies the connection configuration of the internal network 3 on the basis of the device information transmitted from the information devices 5 that have already been connected to the internal network 3, and the device information transmitted from the unknown information device X the connection of which has been detected. When the specific information includes connection configuration information, the management unit 20 identifies the connection configuration of the internal network 3 on the basis of the device information and the connection configuration information. The management unit 20 may identify the connection configuration of the internal network 3, using not only the device information and the connection configuration information but also the identification information of the information devices 5. The information devices 5 that have already been connected to the internal network 3 are information devices 5 that were connected to the internal network 3 before performing the device authorization process of this time, and have been registered in advance on the table, as shown in FIG. 3.

In step S507, the management unit 20 generates map information representing the identified connection configuration of the internal network 3, as shown in FIG. 4.

In step S508, the management unit 20 generates an authorization request for the unknown information device X the connection of which has been detected. At this time, the management unit 20 generates an authorization request including the generated map information. To be more specific, as shown in FIG. 6A, the management unit 20 generates an authorization request screen to notify the user of the authorization request including the map information. The authorization request screen of FIG. 6A has a button to let the user determine whether or not to authorize the unknown information device X, as the authorization request for the unknown information device X the connection of which has been detected. The authorization request screen of FIG. 6A further includes the map information of the internal network 3, in addition to the authorization request. The map information of FIG. 6A includes an image of the unknown information device X, the device information of the unknown information device X, and connection relationship (links) of the unknown information device X with the other information devices 5.

In step S509, the management unit 20 notifies the user of the generated authorization request. To be more specific, the management unit 20 transmits the authorization request screen including the generated authorization request, as shown in FIG. 6A, to the user's information terminal.

The user browses the authorization request screen transmitted from the management unit 20. The user can push an authorization button to authorize the unknown information device X or an unauthorization button, while checking the map information. Upon pushing the button, the management unit 20 is notified of a response from the user to the authorization request for the unknown information device X. The management unit 20 can determine whether or not to authorize access of the unknown information device X to the internal network 3, in accordance with the user's response to the authorization request.

In step S510, the management unit 20 determines that the unknown information device X the connection of which has been detected is an information device 5 nonconforming to HTIP. In other words, when the specific information transmitted from the unknown information device X the connection of which has been detected includes no device information, the management unit 20 determines that the unknown information device X is an information device 5 nonconforming to HTIP.

In step S511, the management unit 20 generates warning information to notify the user that the unknown information device X the connection of which has been detected may be a fraudulent information device 5. At this time, the management unit 20 generates the warning information including the identification information of the unknown information device X.

In step S512, the management unit 20 identifies the connection configuration of the internal network 3, in the same manner as that in step S506. At this time, the management unit 20 identifies the connection position of the unknown information device X in the internal network 3 on the basis of the identification information transmitted from the unknown information device X the connection of which has been detected.

In step S513, the management unit 20 generates map information on the basis of the specific information transmitted from the information devices 5 that have already been connected to the internal network 3, and the identification information transmitted from the unknown information device X the connection of which has been detected. At this time, as shown in FIG. 6B, the management unit 20 generates map information by incorporating a certain icon image such as "? mark" into the connection position of the unknown information device X.

In step S514, the management unit 20 generates an authorization request for the unknown information device X the connection of which has been detected. At this time, the management unit 20 generates the authorization request, in a manner that includes the generated map information and warning information. To be more specific, as shown in FIG. 6B, the management unit 20 generates an authorization request screen to notify the user of the authorization request including the map information and the warning information.

The authorization request screen of FIG. 6B includes, just as with FIG. 6A, the authorization request that is indicated by a button to let the user determine whether or not to authorize the unknown information device X, and the map information of the internal network 3. The authorization request screen of FIG. 6B further includes the warning information including the identification information, i.e., a MAC address, of the unknown information device X. After that, the operation proceeds to step S509, and the management unit 20 transmits the authorization request screen to the user's information terminal, as shown in FIG. 6B.

In step S515, the management unit 20 determines whether or not to have received a response to authorize the unknown information device X, as a user's response to the transmitted authorization request. When the management unit 20 has received the response to authorize the unknown information device X, the operation proceeds to step S516. On the other hand, when the management unit 20 has received no response to authorize the unknown information device X, the operation proceeds to step S518.

In step S516, the management unit 20 determines to authorize access of the unknown information device X the connection of which has been detected, to the internal network 3.

In step S517, the management unit 20 registers the authorization of the unknown information device X the connection of which has been detected, on a table as shown in FIG. 3. After that, the management unit 20 ends the process.

In step S518, the management unit 20 determines not to authorize access of the unknown information device X the connection of which has been detected, to the internal network 3.

In step S519, the management unit 20 registers the unauthorization of the unknown information device X the connection of which has been detected, on the table as shown in FIG. 3. After that, the management unit 20 ends the process.

When the unknown information device X the connection of which has been detected is an information device 5 nonconforming to HTIP, the management unit 20 may not perform steps S512 and S513, and generate an authorization request including only the warning information in step S514. When the unknown information device X the connection of which has been detected is an information device 5 nonconforming to HTIP, the management unit 20 may thereby notify the user of the authorization request including no map information, in step S509.

The management unit 20 may perform step S504, irrespective of a determination result of step S503. In other words, the management unit 20 may perform step S504, irrespective of whether or not the information device 5 the connection of which has been detected is an unknown information device X, which is unauthorized by the user as a valid information device 5. The management unit 20 may thereby notify the user of an authorization request for the information device 5 the connection of which has been detected, in step S509, irrespective of whether or not the information device 5 the connection of which has been detected is an unknown information device X, which is unauthorized by the user as a valid information device 5. In this case, the management unit 20 may not perform step S517 or S519, and not register the authorization or unauthorization of the unknown information device X the connection of which has been detected, on the table of FIG. 3.

First Embodiment: Functional Effects

As described above, the management unit 20 according to the first embodiment collects the specific information from the unknown information device X, and generates the map information on the basis of the collected specific information. The management unit 20 notifies the user of the authorization request for the unknown information device X in a manner that includes the map information. Then, the management unit 20 determines whether or not to authorize access of the unknown information device X to the internal network 3, in accordance with the user's response to the authorization request. Therefore, in the network system 1 according to the first embodiment, the user himself or herself can determine whether or not the unknown information device X is a valid information device 5. Whether or not to authorize access of the unknown information device X can be determined in accordance with the user's determination. In addition, according to the network system 1, the user can determine whether or not the unknown information device X is a valid information device 5 with the simple operation, while checking the image, connection position, category, maker name, model name, model number, and the like of the unknown information device X in the internal network 3. Therefore, the network system 1 can reliably prevent access of a fraudulent information device 5 to the internal network 3, with the simple method, without providing a complicated security system or requiring the user to understand network technology in enough detail. Accordingly, the network system 1 according to the first embodiment can easily augment the security of the internal network 3.

When the unknown information device X is an information device 5 nonconforming to HTIP, the management unit 20 according to the first embodiment can generate the warning information including the identification information of the unknown information device X. Then, the management unit 20 can notify the user of the authorization request for the unknown information device X including the warning information. Therefore, in the network system 1 according to the first embodiment, irrespective of whether or not the unknown information device X is an information device 5 conforming to HTIP, it is possible to determine whether or not to authorize access of the unknown information device X to the internal network 3, in accordance with the determination of the user himself or herself. Therefore, irrespective of whether or not the unknown information device X is an information device 5 conforming to HTIP, the network system 1 can reliably prevent access of a fraudulent information device 5 to the internal network 3, with the simple method. Accordingly, since the network system 1 according to the first embodiment can be applied to the internal network 3 in which various information devices 5 are mixed, it is possible to further easily augment the security of the internal network 3.

In particular, even when the unknown information device X is an information device 5 nonconforming HTIP, the management unit 20 according to the first embodiment can generate the map information. Then, the management unit 20 can notify the user of the authorization request for the unknown information device X in a manner that includes the warning information and the map information. Thus, in the network system 1 according to the first embodiment, the user can easily determine whether or not the unknown information device X is a valid information device 5, on the basis of the connection position and identification information of the unknown information device X. Therefore, the network system 1 according to the first embodiment can further easily augment the security of the internal network 3, even if various information devices 5 are mixed in the internal network 3.

When the information device 5 the connection of which has been detected is an authorized information device 5 that has been authorized by the user as a valid information device 5, the management unit 20 according to the first embodiment need not notify the user of the authorization request for the information device 5 the connection of which has been detected. Thus, the network system 1 according to the first embodiment can reliably prevent access of a fraudulent information device 5 to the internal network 3, without securing any resource to notify the user of the authorization request for the authorized information device 5. Therefore, the network system 1 according to the first embodiment can further easily augment the security of the internal network 3.

Second Embodiment

A network system 1 according to a second embodiment will be described. In the description of the network system 1 according to the second embodiment, the description of the same configuration and operation as those in the network system 1 according to the first embodiment will be omitted to avoid overlaps.

Figure 7:
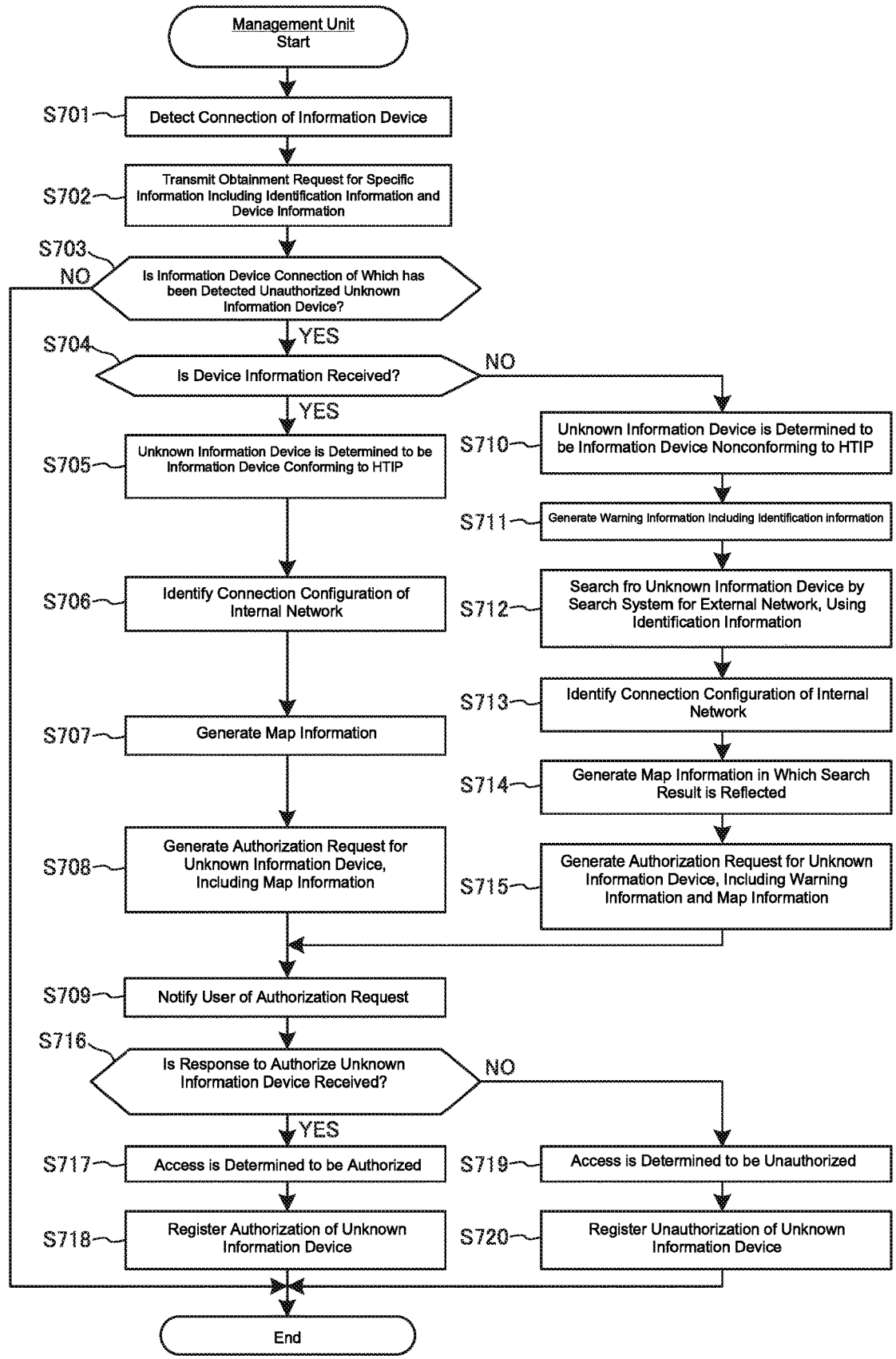
FIG. 7 is a flowchart of a device authorization process performed by a management unit according to a second embodiment.

FIG. 7 is a flowchart of a device authorization process performed by a management unit 20 according to the second embodiment.

As described above, when the unknown information device X the connection of which has been detected is an information device 5 nonconforming to HTIP, the management unit 20 according to the first embodiment identifies the connection position of the unknown information device X in the internal network 3 on the basis of the identification information of the unknown information device X. As described in step S514 of FIG. 5, the management unit 20 according to the first embodiment generates the map information by incorporating the certain icon image, such as "? mark," into the identified connection position.

On the contrary, when the unknown information device X the connection of which has been detected is an information device 5 nonconforming to HTIP, the management unit 20 according to the second embodiment generates map information by performing a process of steps S712 to S714 of FIG. 7.

In other words, the management unit 20 according to the second embodiment searches for the unknown information device X by a search system for the external network 2, using the identification information transmitted from the unknown information device X. Then, the management unit 20 generates map information on the basis of the search result. For example, in step S712, the management unit 20 according to the second embodiment searches for an image and/or device information of the unknown information device X by a Web search system, i.e., the search system for the external network 2, using a MAC address transmitted from the unknown information device X. In step S714, the management unit 20 according to the second embodiment generates map information in which the search result is reflected, by incorporating the image and/or device information obtained from the search result into the connection position of the unknown information device X, which has been identified in step S713.

As described above, in the network system 1 according to the second embodiment, even when the unknown information device X is an information device 5 nonconforming to HTIP, the user can determine whether or not the unknown information device X is a valid information device 5, while checking the image and/or device information of the unknown information device X. Therefore, the network system 1 according to the second embodiment can easily augment the security of the internal network 3, even if various information devices 5 are mixed in the internal network 3.

Even if the unknown information device X the connection of which has been detected is an information device 5 conforming to HTIP, the management unit 20 according to the second embodiment may generate map information on the basis of a search result on the search system for the external network 2, just as in the case of the information device 5 nonconforming to HTIP.

[Others]

In the above-described embodiments, the network system 1 corresponds to an example of "network system" described in the scope of claims. The external network 2 corresponds to an example of "external network" described in the scope of claims. The internal network 3 corresponds to an example of "internal network" described in the scope of claims. The information device 5 corresponds to an example of "information device" described in the scope of claims. The management unit 20 corresponds to an example of "management unit" described in the scope of claims.

It is apparent to those skilled in the art that the technique of one of the embodiments, including its modification examples, can be mutually applied to the other embodiment.

The above-described description is not intended to limit the invention, but is simply intended as examples. Therefore, it is apparent to those skilled in the art that the embodiments of the present invention can be modified without departing from the scope of claims.

The terms used in this specification and the scope of claims should be interpreted as unlimited terms. For example, the term of "include" should be interpreted as "not limited to an object that is described as an object to be included." The term of "provide" should be interpreted as "not limited to an object that is described as an object to be provided." The term of "have" should be interpreted as "not limited to an object that is described as an object to be had."

REFERENCE SIGNS LIST 1 network system
2 external network
3 internal network
5 information device
10 gateway
11 network device
12 end terminal
13 end terminal
14 end terminal
15 end terminal
20 management unit
21 connection detection unit
22 information collection unit
23 device determination unit
24 connection configuration identification unit
25 map information generation unit
26 warning information generation unit
27 authorization request generation unit
28 information notification unit
29 access authorization determination unit
30 information registration unit

The invention claimed is:

1. A network system comprising:
an information device included in an internal network connected to an external network, the information device being configured to transmit specific information including its own identification information and device information provided in advance, in conformity with a predefined protocol; and
a management unit configured to monitor the internal network, and collect the specific information from the information device in conformity with the predefined protocol, wherein
the management unit
collects specific information from an unknown information device, the specific information of the unknown information device including its own identification information and device information,
notifies a user of an authorization request for the unknown information device on a basis of the collected specific information,
determines whether or not to authorize access of the unknown information device to the internal network, in accordance with a response from the user to the authorization request,
generates map information, including connection configuration information which is correspondence information between a port number of each port of an information device with multiple ports and a MAC (media access control) address of the information device connected to each port, representing an image of the following: each information device and each information device with multiple ports, the device information and the port number of the information device with multiple ports connected to each information device, and a connection relationship with other information devices and/or the information device with multiple ports, to make a topology of the internal network visible to the user, on a basis of the collected specific information, and
notifies the user of the generated map information in a manner that is included in the authorization request.

2. The network system according to claim 1, wherein when the unknown information device is an information device conforming to the predefined protocol, the management unit
generates the map information on a basis of the device information transmitted from the information device having already been connected to the internal network and the device information transmitted from the unknown information device.

3. The network system according to claim 2, wherein when the unknown information device is an information device nonconforming to the predefined protocol, the management unit
generates warning information including the identification information transmitted from the unknown information device, and
notifies the user of the generated warning information in a manner that is included in the authorization request.

4. The network system according to claim 1, wherein the management unit searches for the unknown information device by a search system for the external network using the identification information transmitted from the unknown information device, and generates the map information on a basis of a search result.

5. The network system according to claim 1, wherein the internal network is a home network,
the predefined protocol is HTIP (home-network topology identifying protocol), the device information represents a category, a maker name, a model name, and a model number of the information device, and the identification information is a MAC (media access control) address.

6. The network system according to claim 2, wherein the management unit searches for the unknown information device by a search system for the external network using the identification information transmitted from the unknown information device, and generates the map information on a basis of a search result.

7. The network system according to claim 3, wherein the management unit searches for the unknown information device by a search system for the external network using the identification information transmitted from the unknown information device, and generates the map information on a basis of a search result.

8. The network system according to claim 2, wherein the internal network is a home network, the predefined protocol is HTIP (home-network topology identifying protocol), the device information represents a category, a maker name, a model name, and a model number of the information device, and the identification information is a MAC (media access control) address.

9. The network system according to claim 3, wherein the internal network is a home network, the predefined protocol is HTIP (home-network topology identifying protocol), the device information represents a category, a maker name, a model name, and a model number of the information device, and the identification information is a MAC (media access control) address.

10. The network system according to claim 4, wherein the internal network is a home network, the predefined protocol is HTIP (home-network topology identifying protocol), the device information represents a category, a maker name, a model name, and a model number of the information device, and the identification information is a MAC (media access control) address.

11. The network system according to claim 6, wherein the internal network is a home network, the predefined protocol is HTIP (home-network topology identifying protocol), the device information represents a category, a maker name, a model name, and a model number of the information device, and the identification information is a MAC (media access control) address.

12. The network system according to claim 7, wherein the internal network is a home network, the predefined protocol is HTIP (home-network topology identifying protocol), the device information represents a category, a maker name, a model name, and a model number of the information device, and the identification information is a MAC (media access control) address.

* * * * *